(12) United States Patent
Nanditale et al.

(10) Patent No.: US 8,924,625 B2
(45) Date of Patent: Dec. 30, 2014

(54) METHOD AND SYSTEM OF REDUCING NUMBER OF COMPARATORS IN ADDRESS RANGE OVERLAP DETECTION AT A COMPUTING SYSTEM

(75) Inventors: Shankara Rao Thejaswi Nanditale, Bangalore (IN); Anand G Shirahatti, Bangalore (IN); Rahul Jain, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 359 days.

(21) Appl. No.: 13/534,005

(22) Filed: Jun. 27, 2012

(65) Prior Publication Data

US 2014/0006682 A1    Jan. 2, 2014

(51) Int. Cl.
*G06F 12/00*  (2006.01)
*G06F 12/08*  (2006.01)

(52) U.S. Cl.
USPC .... 711/102; 711/206; 711/115; 711/E12.007; 711/E12.019; 711/E12.061

(58) Field of Classification Search
USPC .......... 711/102, 206, 115, E12.007, E12.019, 711/E12.061
See application file for complete search history.

(56) References Cited

U.S. PATENT DOCUMENTS

2011/0016264 A1*    1/2011 Yoshida et al. ............... 711/103

* cited by examiner

*Primary Examiner* — Yong Choe
(74) *Attorney, Agent, or Firm* — Zilka-Kotab, PC (57) ABSTRACT

A method includes implementing, with a memory of a computing device, a memory controller of the memory of the computing device, a storage device coupled to the computing device and/or an external device coupled to the computing device, a scheme for detecting an overlap between a first address range and a second address range. The first address range includes a first starting address and a first ending address, and the second address range includes a second starting address and a second ending address. The method also includes reducing a number of comparators utilized in the address range overlap detection through solely determining whether the first starting address is within the second address range or the second starting address is within the first address range.

20 Claims, 9 Drawing Sheets

| OUTPUT OF $C_1$ 202 | OUTPUT OF $C_2$ 204 | OUTPUT OF $C_5$ 210 | OUTPUT OF $C_6$ 212 | OUTPUT OF AND GATE 218 | OUTPUT OF AND GATE 222 | OUTPUT OF OR GATE 226 |
|---|---|---|---|---|---|---|
| 1 | 1 | 1 | 1 | 1 | 1 | 1 |

FIGURE 4

$S_1 > S_2$ AND $S_1 <= E_2$ AND $E_1 > E_2$:

| OUTPUT OF $C_1$ 202 | OUTPUT OF $C_2$ 204 | OUTPUT OF $C_5$ 210 | OUTPUT OF $C_6$ 212 | OUTPUT OF AND GATE 218 | OUTPUT OF AND GATE 222 | OUTPUT OF OR GATE 226 |
|---|---|---|---|---|---|---|
| 1 | 1 | 0 | 1 | 1 | 0 | 1 |

FIGURE 5

$S_1 < S_2$ AND $E_1 >= S_2$ AND $E_1 <= E_2$:

| OUTPUT OF $C_1$ 202 | OUTPUT OF $C_2$ 204 | OUTPUT OF $C_5$ 210 | OUTPUT OF $C_6$ 212 | OUTPUT OF AND GATE 218 | OUTPUT OF AND GATE 222 | OUTPUT OF OR GATE 226 |
|---|---|---|---|---|---|---|
| 0 | 1 | 1 | 1 | 0 | 1 | 1 |

FIGURE 6

$S_1 > S_2$ AND $E_1 < E_2$:

| OUTPUT OF $C_1$ 202 | OUTPUT OF $C_2$ 204 | OUTPUT OF $C_5$ 210 | OUTPUT OF $C_6$ 212 | OUTPUT OF AND GATE 218 | OUTPUT OF AND GATE 222 | OUTPUT OF OR GATE 226 |
|---|---|---|---|---|---|---|
| 1 | 1 | 0 | 1 | 1 | 0 | 1 |

FIGURE 7

$S_2 > S_1$ AND $E_2 < E_1$:

| OUTPUT OF $C_1$ 202 | OUTPUT OF $C_2$ 204 | OUTPUT OF $C_5$ 210 | OUTPUT OF $C_6$ 212 | OUTPUT OF AND GATE 218 | OUTPUT OF AND GATE 222 | OUTPUT OF OR GATE 226 |
|---|---|---|---|---|---|---|
| 0 | 1 | 1 | 1 | 0 | 1 | 1 |

METHOD AND SYSTEM OF REDUCING NUMBER OF COMPARATORS IN ADDRESS RANGE OVERLAP DETECTION AT A COMPUTING SYSTEM

FIELD OF TECHNOLOGY

This disclosure relates generally to memory/storage based computing systems and, more particularly, to a method, an apparatus and/or a system of reducing number of comparators in address range overlap detection at a computing system.

BACKGROUND

A computing device may include a memory (a non-volatile memory, a volatile memory, a cache memory) and a storage device coupled thereto. The computing device may also include an external device coupled thereto. A command initiated from a host device (e.g., computing device, storage device, external device) may require resolution of an address range overlap between two sets of instructions at the same device or at different devices. The aforementioned resolution of the address range overlap may involve determining the overlap between a first address range and a second address range. Determination of the overlap between the first address range and the second address range may involve a number of comparators, outputs of which are applied to appropriate logic gates. Utilization of the number of comparators may lead to undesirable computational power and time consumption.

SUMMARY

Disclosed are a method, an apparatus and/or a system of reducing number of comparators in address range overlap detection at a computing system.

In one aspect, a method includes implementing, with a memory of a computing device, a memory controller of the memory of the computing device, a storage device coupled to the computing device and/or an external device coupled to the computing device, a scheme for detecting an overlap between a first address range and a second address range. The first address range includes a first starting address and a first ending address, and the second address range includes a second starting address and a second ending address. The method also includes reducing a number of comparators utilized in the address range overlap detection through solely determining whether the first starting address is within the second address range or the second starting address is within the first address range.

In another aspect, an optimized hardware scheme implemented with a memory of a computing device, a memory controller of the memory of the computing device, a storage device coupled to the computing device and/or an external device coupled to the computing device to detect an overlap between a first address range and a second address range is disclosed. The first address range includes a first starting address and a first ending address, and the second address range includes a second starting address and a second ending address. The scheme is configured to solely determine whether the first starting address is within the second address range or the second starting address is within the first address range to allow for implementation with a reduced number of comparators compared to a scheme additionally determining whether the first ending address is within the second address range or the second ending address is within the first address range.

In yet another aspect, a computing device includes a processor, and a memory having storage locations addressable through the processor. The memory includes a scheme for detecting an overlap between a first address range and a second address range implemented therewith or implemented with a memory controller thereof. The first address range includes a first starting address and a first ending address, and the second address range includes a second starting address and a second ending address. The scheme is implemented through a reduced number of comparators utilized in the address range overlap detection through solely determining whether the first starting address is within the second address range or the second starting address is within the first address range.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or an apparatus of reducing number of comparators in address range overlap detection at a computing system. Although the present embodiments have been described with reference to specific example embodiments, it will be evident that various modifications and changes may be made to these embodiments without departing from the broader spirit and scope of the various embodiments.

Figure 1:
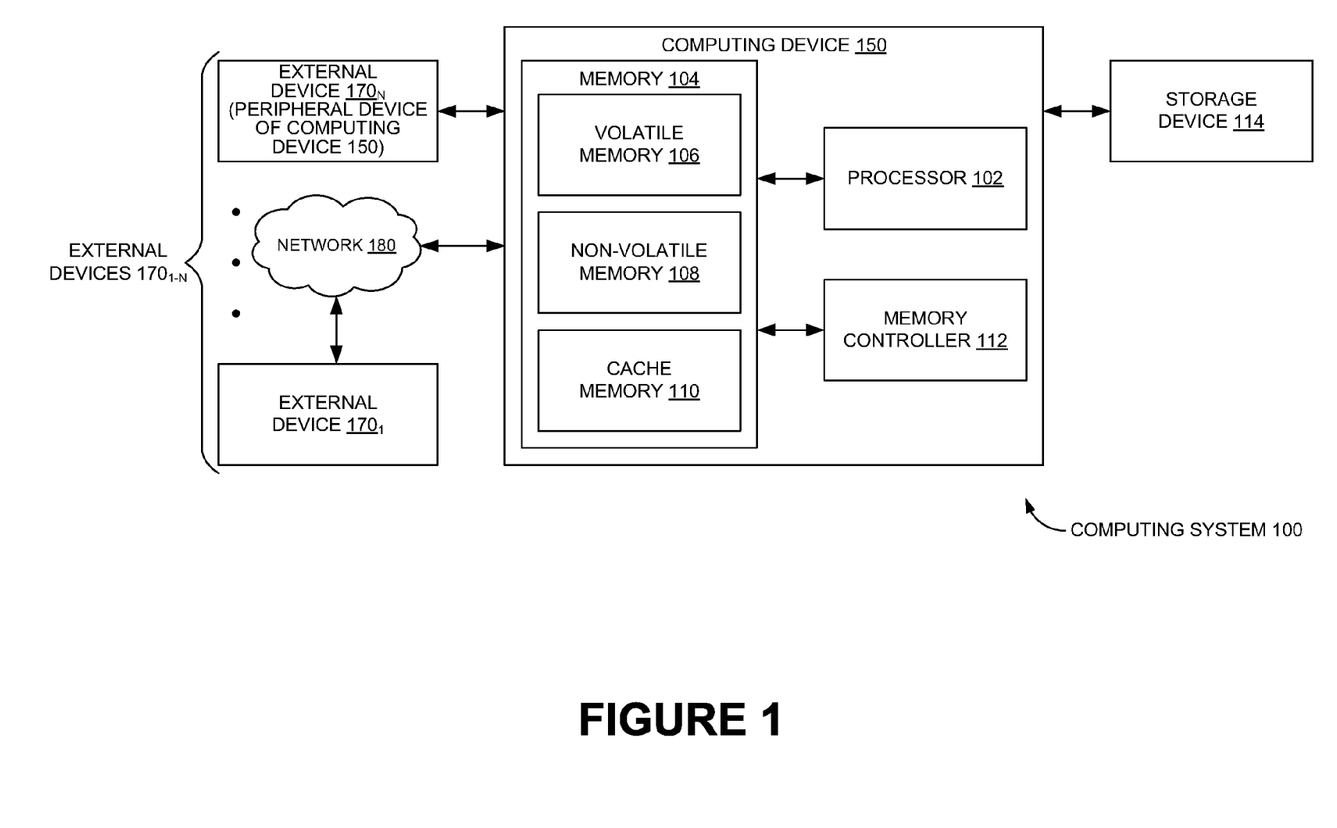
FIG. 1 is a schematic view of a computing system, according to one or more embodiments.

FIG. 1 shows a computing system 100, according to one or more embodiments. In one or more embodiments, computing system 100 may include a computing device 150 (e.g., a data server) coupled to one or more external devices 170$_{1-N}$ (e.g., through a network 180). In one or more embodiments, computing device 150 may include a processor 102 communicatively coupled to a memory 104. In one or more embodiments, memory 104 may include storage locations configured to be addressable through processor 102. In one or more embodiments, memory 104 may, in turn, include a volatile memory 106, a non-volatile memory 108 and/or a cache memory 110. In one or more embodiments, computing system 100 may also include a memory controller 112 configured to control data flow to and from memory 104.

In one or more embodiments, computing device 150 may also store data associated therewith in a storage device 114 (e.g., a hard disk drive, a Redundant Array of Independent Disks (RAID)-based device). In one or more embodiments, storage device 114 may coupled to computing device 150 through another network (e.g., analogous to network 180, or, network 180). In other words, storage device 114 may be a remote storage device, or, part of a storage network. FIG. 1 shows one external device $170_{1-N}$ as being a computing device and another external device $170_{1-N}$ as being a peripheral device of computing device 150. It is obvious that the one or more external devices $170_{1-N}$ may be storage devices including the remote storage device 114 and/or Just a Bunch of Drives (JBODs) of a Serial Attached Small Computer System Interface (SAS) communication system.

In one or more embodiments, a command initiated from a host device (e.g., computing device 150, storage device 114, one or more external devices $170_{1-N}$) may require resolution of an address range overlap (e.g., between two sets of instructions such as load instructions and store instructions at the same device, between instructions (e.g., loading data onto memory 104 and storing data in storage device 114) associated with one device and instructions associated with another device) at computing device 150. In one or more embodiments, the resolution of an address range overlap may involve determination of the address range overlap through a numerical comparison between two address number ranges, for example, Range 1 {S1, E1} and Range 2 {S2, E2}, S1 being the starting address of Range 1, E1 being the ending address of Range 1, S2 being the starting address of Range 2 and E2 being the ending address of Range 2.

Figure 2:
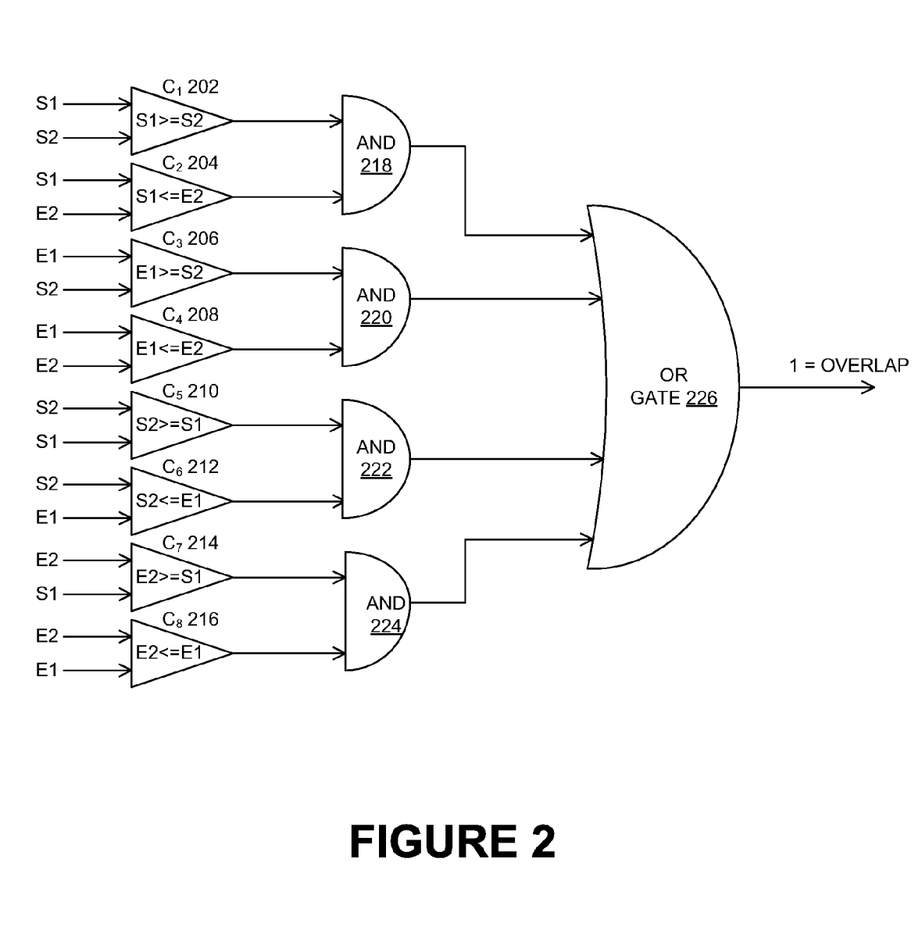
FIG. 2 is a schematic of address range overlap determination at a computing device of the computing system of FIG. 1.

FIG. 2 shows a scheme of address range overlap determination at computing device 150. In accordance with the aforementioned scheme, an address range overlap occurs when S1 is within Range 2 {S2, E2} or when E1 is within Range 2 {S2, E2} or when S2 is within Range 1 {S1, E1} or when E2 is within Range 1 {S1, E1}. Therefore, in the scheme shown in FIG. 2, the outputs of appropriate comparators, viz., C1 202 related to verifying as to whether S1>=S2, C2 204 related to verifying as to whether S1<=E2, C3 206 related to verifying as to whether E1>=S2 and C4 208 related to verifying as to whether E1<=E2, C5 210 related to verifying as to whether S2>=S1, C6 212 related to verifying as to whether S2<=E1, C7 214 related to verifying as to whether E2>=S1 and C8 216 related to verifying as to whether E2<=E1, may be applied to appropriate AND gates, viz., AND gate 218, AND gate 220, AND gate 222 and AND gate 224. Specifically, the outputs of C1 202 and C2 204 may be applied to AND gate 218, the outputs of C3 206 and C4 208 may be applied to AND gate 220, the outputs of C5 210 and C6 212 may be applied to AND gate 222, and the outputs of C7 214 and C8 216 may be applied to AND gate 224 respectively. The outputs of AND gate 218, AND gate 220, AND gate 222 and AND gate 224 may be applied to OR gate 226.

When the output of OR gate 226 is a logical 1, it may be determined that an address range overlap occurs. It can be easily deduced that even if any one of the AND gates 218-224 outputs a logical 1 (implying at least a partial overlap), the output of OR gate 226 is a logical 1.

Figure 3:
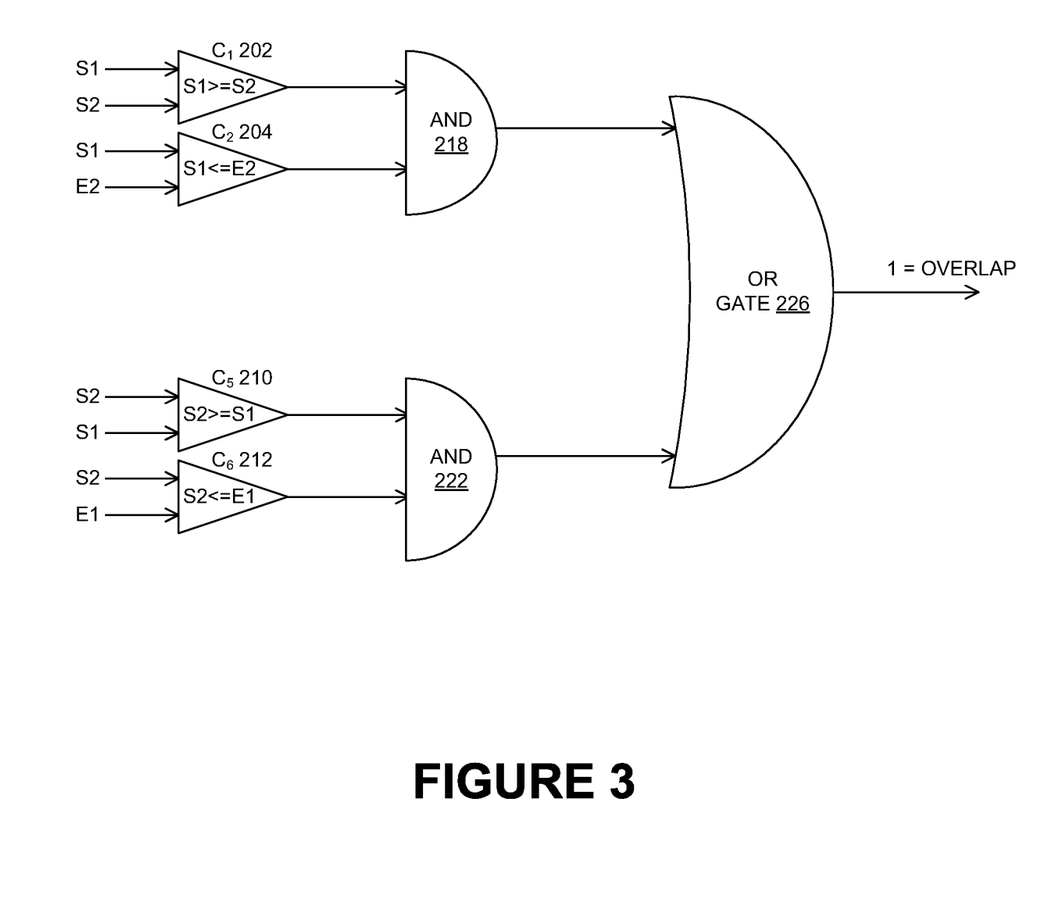
FIG. 3 is another schematic of address range overlap determination at the computing device of the computing system of FIG. 1, according to one or more embodiments.

FIG. 3 shows another scheme of address range overlap determination at computing device 150 with a reduced number of comparators therefor, according to one or more embodiments. In one or more embodiments, according to this scheme, an address range overlap occurs when S1 is within Range 2 {S2, E2} or when S2 is within Range 1 {S1, E1}. Therefore, as shown in FIG. 3, C1 202 and C2 204, AND gate 218 configured to have outputs of C1 202 and C2 204 applied thereto, C5 210 and C6 212, and AND gate 222 configured to have outputs of C5 210 and C6 212 applied thereto alone may be required. The outputs of AND gate 218 and AND gate 222 may, again, be applied to OR gate 226. Comparators C3 206, C4 208, C7 214 and C8 216, AND gate 220 and AND gate 224 may not be required.

Again, when the output of OR gate 226 is a logical 1, it may be determined that an address range overlap occurs. In one or more embodiments, a few checks may be performed to determine if the scheme indeed does cover all possible variations in scenarios.

Figure 4:
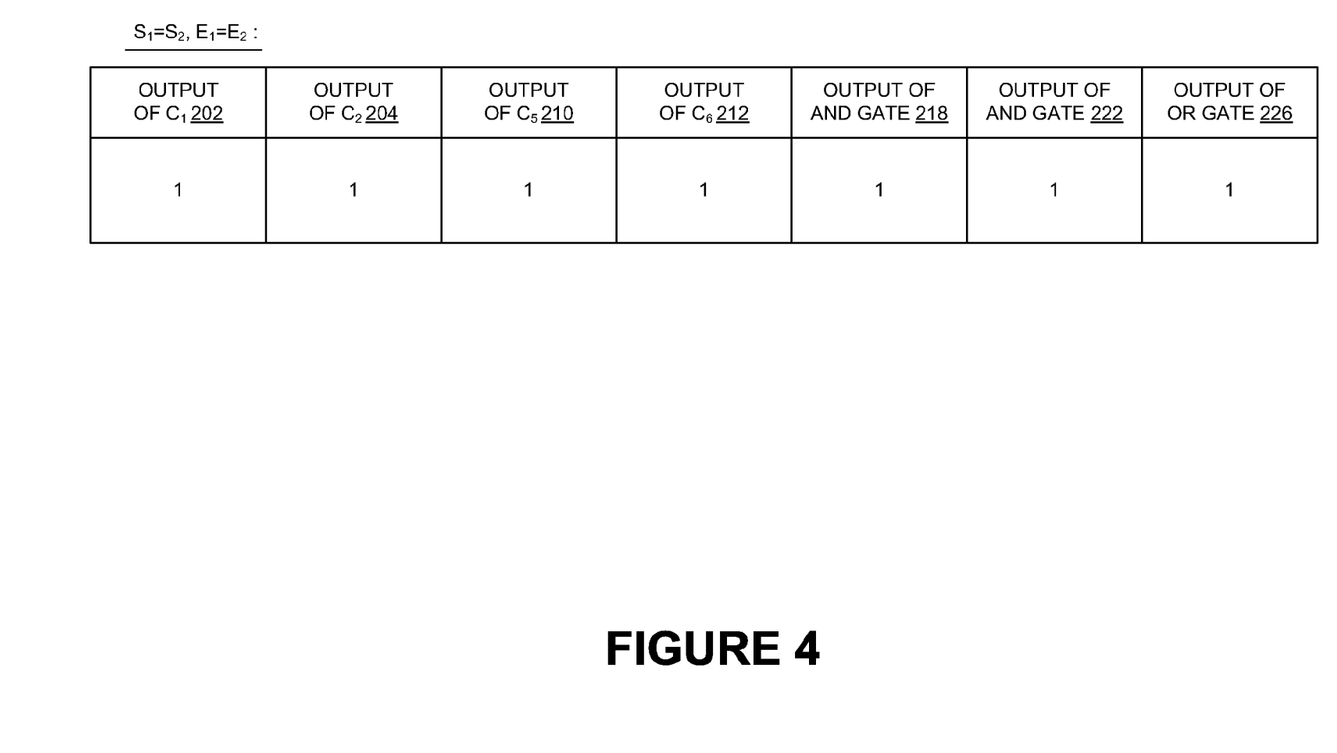
FIGS. 4-8 are truth tables associated with scenarios of the address range overlap determination through the schematic of FIG. 3.

Scenario 1 may involve Range 1 being equal to Range 2. In other words S1=S2 and E1=E2. In this case, the output of C1 202 is 1, the output of C2 204 is 1, the output of C5 210 is 1 and the output of C6 212 is 1. It is obvious that the outputs of AND gate 218 and AND gate 222 are 1. Thus, the output of OR gate 226 is also a 1, thereby implying the address range overlap (complete). FIG. 4 shows a truth table for the aforementioned scenario.

Figure 5:
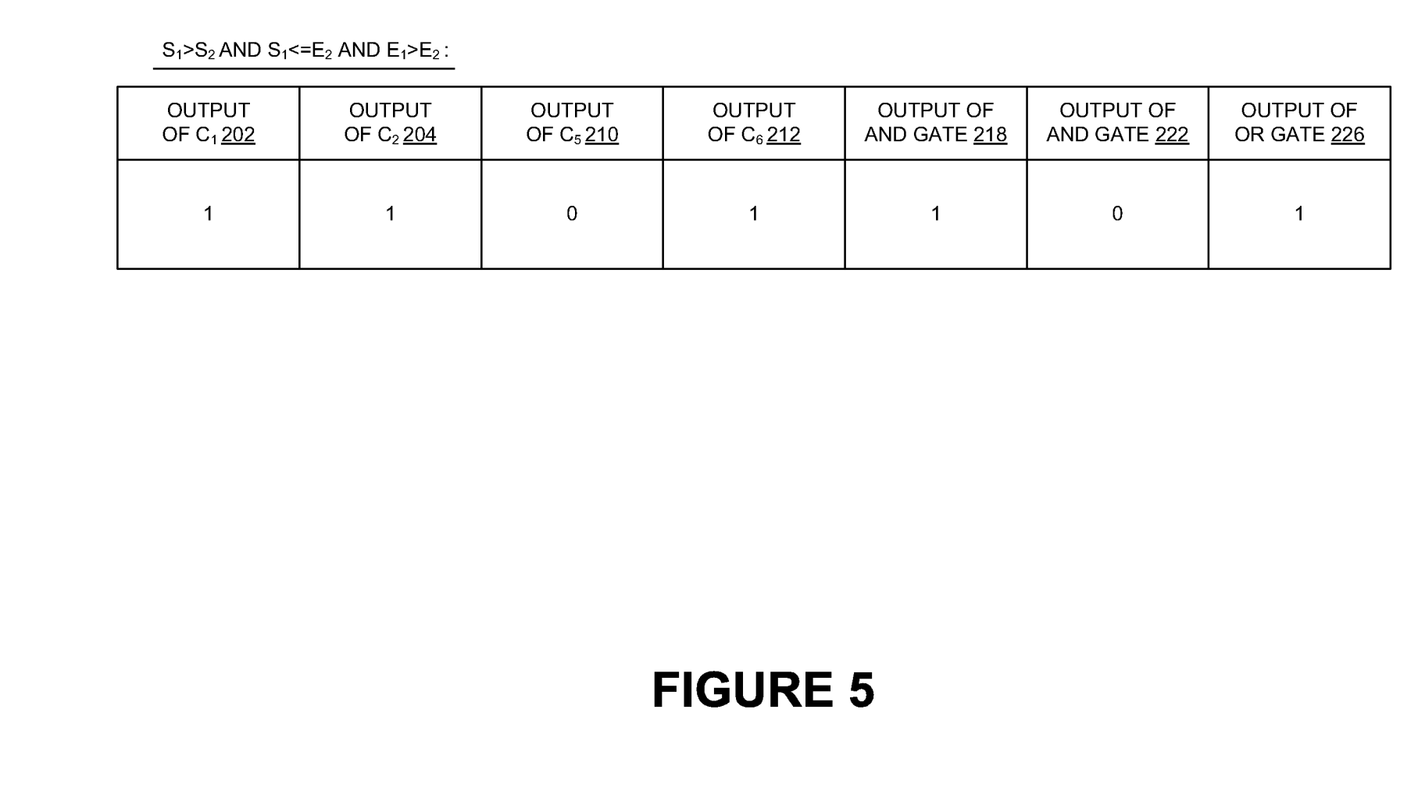

Scenario 2 may involve S1 of Range 1 being within Range 2 and E1 of Range 1 being outside Range 2. In other words, there is a partial address range overlap with S1>S2 AND S1<=E2 AND E1>E2. In this case, the output of C1 202 is 1, the output of C2 204 is 1, the output of C5 210 is 0 and the output of C6 212 is 1. It is obvious that the output of AND gate 218 is 1 and the output of AND gate 222 is 0. Thus, the output of OR gate 226 is a 1, thereby implying the address range overlap (partial here). FIG. 5 shows a truth table for the aforementioned scenario.

Figure 6:
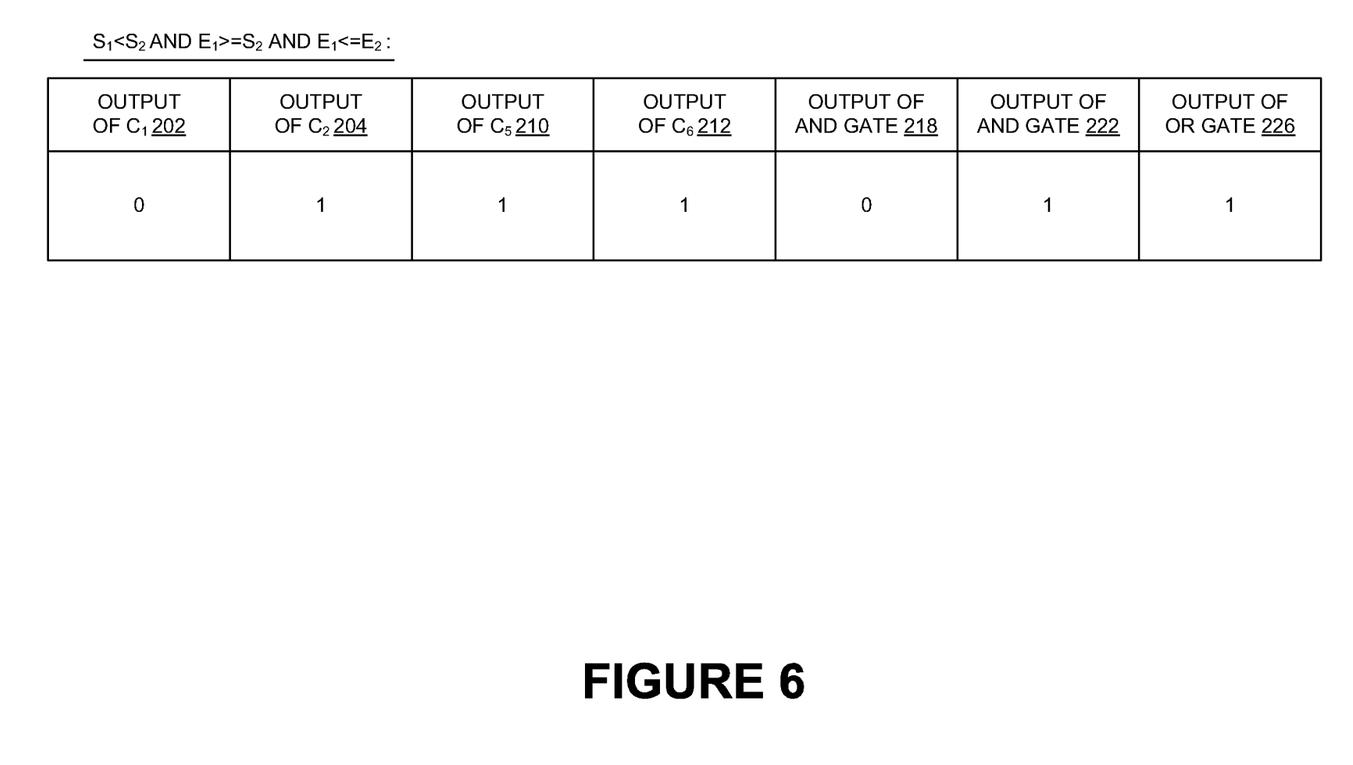

Scenario 3 may involve S1 of Range 1 being outside Range 2 and E1 of Range 1 being within Range 2. In other words, there is a partial address range overlap with S1<S2 AND E1>=S2 AND E1<=E2. In this case, the output of C1 202 is 0, the output of C2 204 is 1, the output of C5 210 is 1 and the output of C6 212 is 1. It is obvious that the output of AND gate 218 is 0 and the output of AND gate 222 is 1. Thus, the output of OR gate 226 is a 1, thereby implying the address range overlap (partial here). FIG. 6 shows a truth table for the aforementioned scenario.

Figure 7:
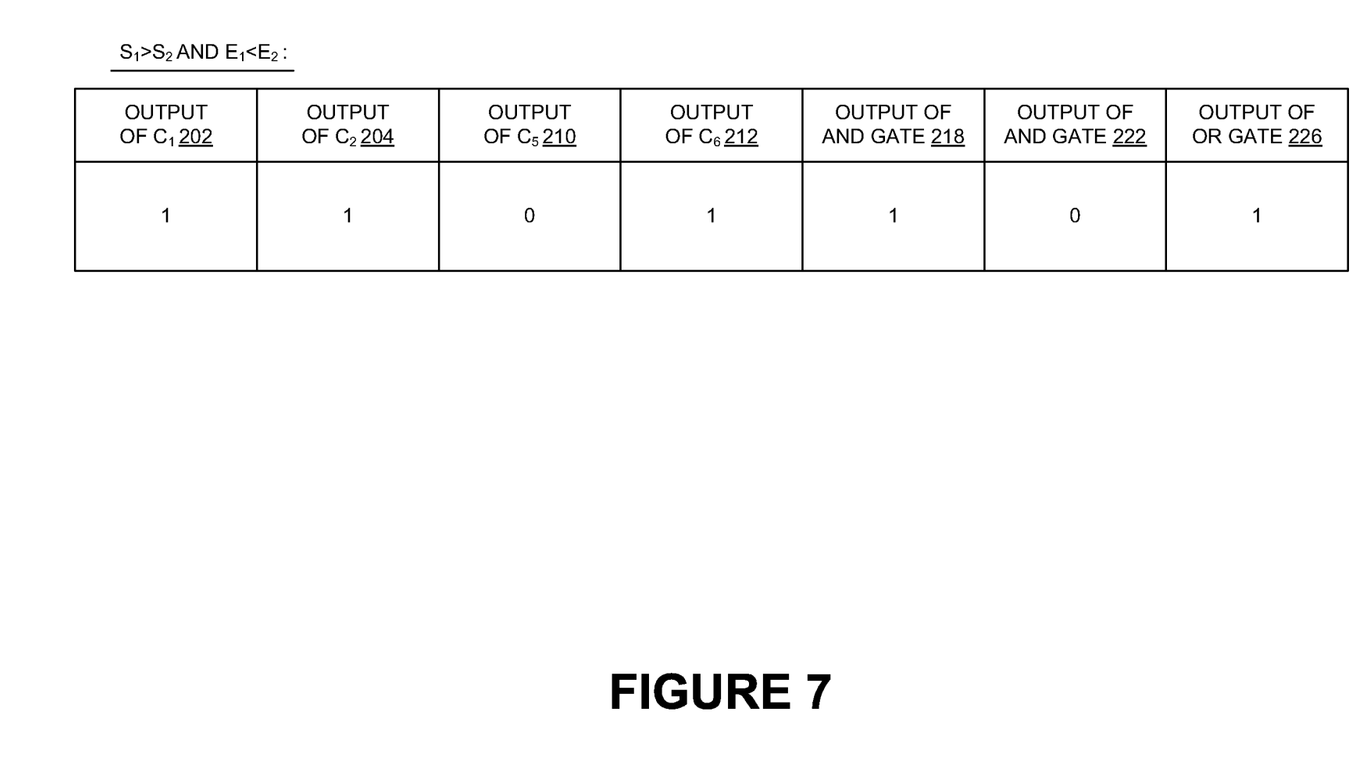

Scenario 4 may involve Range 1 being contained within Range 2. In other words, there is an address range overlap with S1>S2 AND E1<E2. In this case, the output of C1 202 is 1, the output of C2 204 is 1, the output of C5 210 is 0 and the output of C6 212 is 1. It is obvious that the output of AND gate 218 is 1 and the output of AND gate 222 is 0. Thus, the output of OR gate 226 is a 1, thereby implying the address range overlap. FIG. 7 shows a truth table for the aforementioned scenario.

Figure 8:
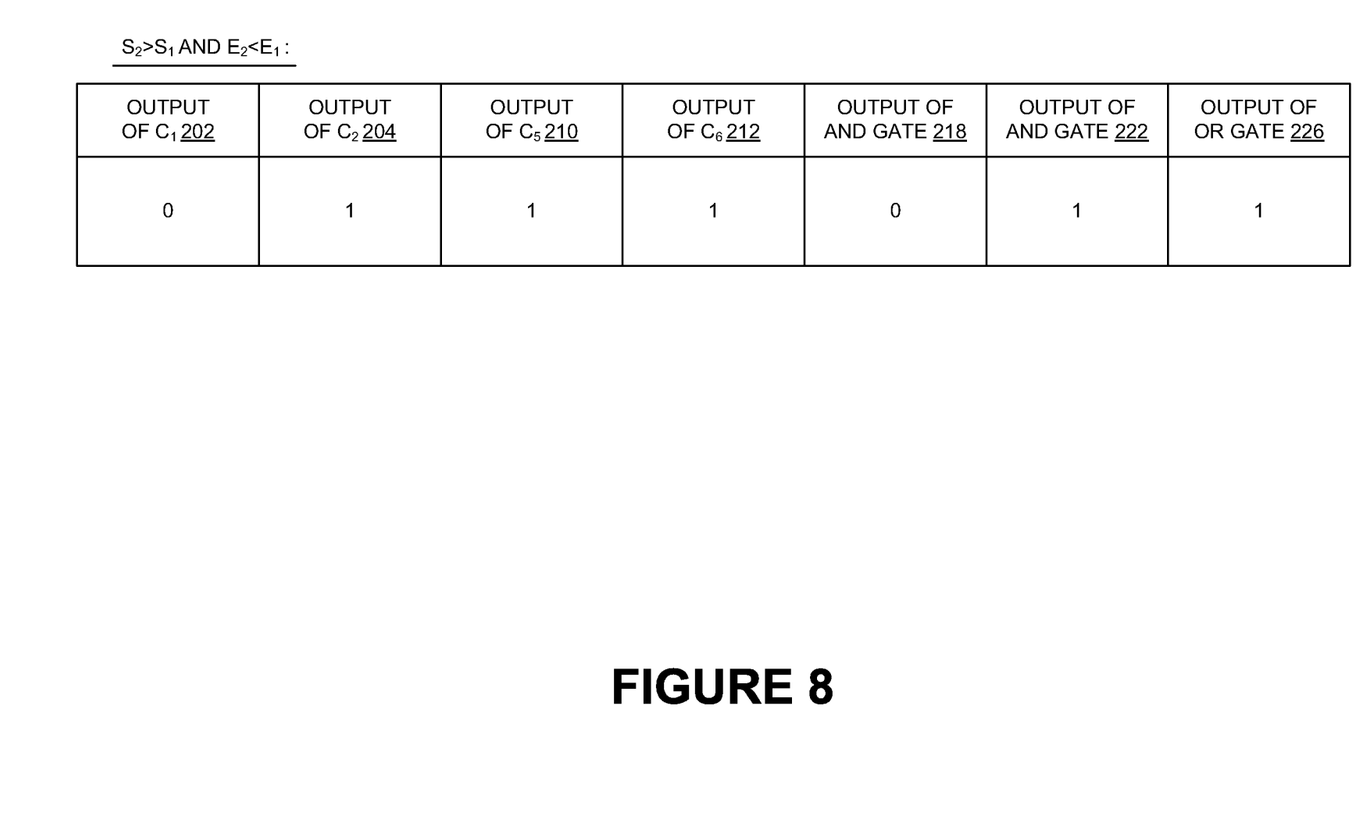

Scenario 5 may involve Range 2 being contained within Range 1. In other words, there is an address range overlap with S2>S1 AND E2<E1. In this case, the output of C1 202 is 0, the output of C2 204 is 1, the output of C5 210 is 1 and the output of C6 212 is 1. It is obvious that the output of AND gate 218 is 0 and the output of AND gate 222 is 1. Thus, the output of OR gate 226 is 1, thereby implying the address range overlap. FIG. 8 shows a truth table for the aforementioned scenario.

Thus, it can readily be seen that the scheme of FIG. 3 readily captures all possible variations in scenarios of address range overlap. Therefore, the extra comparators C3 206, C4 208, C7 214 and C8 216, AND gate 220 and AND gate 224 of FIG. 2 may be dispensed with, thereby providing for time and power savings. In one or more embodiments, as a result, the scheme of FIG. 3 may provide for an optimized hardware solution for detecting overlapping (or, alternately, orthogonal) address ranges. Comparators C1 202, C2 204, C5 210 and C6 212 may be digital comparators implemented in hardware. The AND gates (218 and 222) and OR gate 226 may also be implemented in hardware.

It is obvious that the reduction in the number of comparators may be achieved in implementations involving other logic gates instead of the (AND, OR) gates. Such variations are within the scope of the exemplary embodiments.

In one or more embodiments, the aforementioned scheme of address overlap detection may be utilized in memory controller 112 and/or a software/hardware lookup table implemented with memory 104 for cache/storage purposes. In one or more embodiments, the aforementioned scheme may also be implemented with storage device 114 and/or the one or more external devices $170_{1-N}$ having some form of memory.

Figure 9:
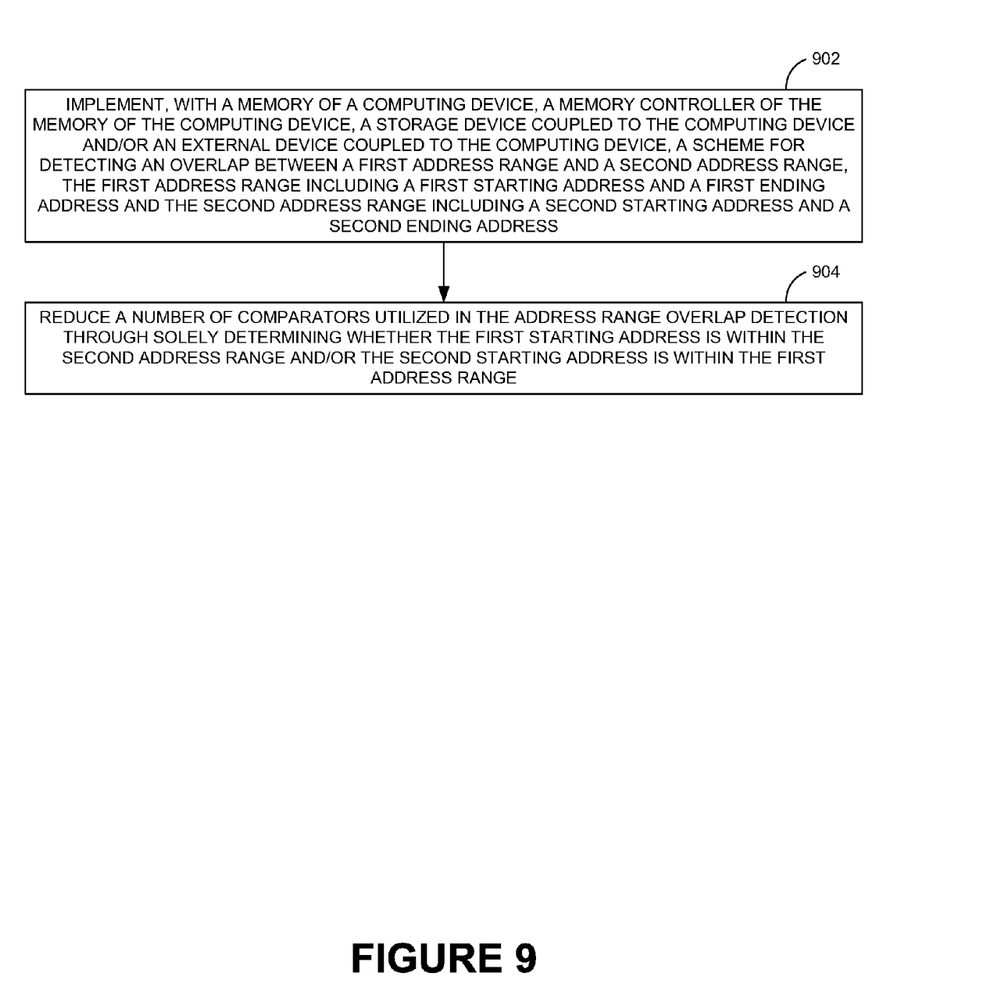
FIG. 9 is a process flow diagram detailing the operations involved in reducing a number of comparators in address range overlap detection at the computing system of FIG. 1, according to one or more embodiments.

FIG. 9 shows a process flow diagram detailing the operations involved in reducing a number of comparators in address range overlap detection at computing system 100 of FIG. 1, according to one or more embodiments. In one or more embodiments, operation 902 may involve implementing, with memory 104 of computing device 150, memory controller 112 of memory 104, storage device 114 coupled to computing device 150 and/or external device $170_{1-N}$ coupled to computing device 150, a scheme for detecting an overlap between a first address range R1 and a second address range R2. The first address range R1 includes a first starting address S1 and a first ending address E1, and the second address range R2 includes a second starting address S2 and a second ending address E2.

In one or more embodiments, operation 904 may involve reducing the number of comparators utilized in the address range overlap detection through solely determining whether the first starting address S1 is within the second address range R2 and/or the second starting address S2 is within the first address range R1.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:
    implementing, with at least one of a memory of a computing device, a memory controller of the memory of the computing device, a storage device coupled to the computing device and an external device coupled to the computing device, a scheme for detecting an overlap between a first address range and a second address range, the first address range including a first starting address and a first ending address, and the second address range including a second starting address and a second ending address; and
    reducing a number of comparators utilized in the address range overlap detection through solely determining whether one of: the first starting address is within the second address range and the second starting address is within the first address range.

2. The method of claim 1, wherein the memory of the computing device includes at least one of a volatile memory, a non-volatile memory and a cache memory.

3. The method of claim 1, wherein the storage device is coupled to the computing device through a network.

4. The method of claim 1, wherein the external device is another computing device coupled to the computing device through a network.

5. The method of claim 1, comprising determining the overlap between the first address range and the second address range corresponding to one of: two sets of instructions associated with a same device and two sets of instructions associated with different devices.

6. The method of claim 1, comprising implementing the scheme with:
    a first comparator to determine if the first starting address is one of greater than and equal to the second starting address;
    a second comparator to determine if the first starting address is one of less than and equal to the second ending address;
    a third comparator to determine if the second starting address is one of greater than and equal to the first starting address;
    a fourth comparator to determine if the second starting address is one of less than and equal to the first ending address;
    a first AND gate having an output of the first comparator and an output of the second comparator as inputs thereto;
    a second AND gate having an output of the third comparator and an output of the fourth comparator as inputs thereto; and
    an OR gate having an output of the first AND gate and an output of the second AND gate as inputs thereto.

7. The method of claim 1, comprising utilizing the scheme in a lookup table implemented with the memory of the computing device.

8. An optimized hardware scheme implemented with at least one of a memory of a computing device, a memory controller of the memory of the computing device, a storage device coupled to the computing device, and an external device coupled to the computing device to detect an overlap between a first address range and a second address range, the first address range including a first starting address and a first ending address, the second address range including a second starting address and a second ending address, and the scheme being configured to:
    solely determine whether one of: the first starting address is within the second address range and the second starting address is within the first address range to allow for implementation with a reduced number of comparators compared to a scheme additionally determining whether one of: the first ending address is within the second address range and the second ending address is within the first address range.

9. The scheme of claim 8, wherein the scheme is implemented with a cache memory of the computing device.

10. The scheme of claim 8, wherein the overlap between the first address range and the second address range corresponds to one of: two sets of instructions associated with a same device and two sets of instructions associated with different devices.

11. The scheme of claim 8, wherein the scheme is implemented with:
- a first comparator to determine if the first starting address is one of greater than and equal to the second starting address;
- a second comparator to determine if the first starting address is one of less than and equal to the second ending address;
- a third comparator to determine if the second starting address is one of greater than and equal to the first starting address;
- a fourth comparator to determine if the second starting address is one of less than and equal to the first ending address;
- a first AND gate having an output of the first comparator and an output of the second comparator as inputs thereto;
- a second AND gate having an output of the third comparator and an output of the fourth comparator as inputs thereto; and
- an OR gate having an output of the first AND gate and an output of the second AND gate as inputs thereto.

12. The scheme of claim 8, wherein the scheme is utilized in a lookup table implemented with the memory of the computing device.

13. A computing device comprising:
- a processor; and
- a memory having storage locations addressable through the processor, the memory having a scheme for detecting an overlap between a first address range and a second address range one of: implemented therewith and implemented with a memory controller thereof, the first address range including a first starting address and a first ending address, the second address range including a second starting address and a second ending address, and the scheme being implemented through a reduced number of comparators utilized in the address range overlap detection through solely determining whether one of: the first starting address is within the second address range and the second starting address is within the first address range.

14. The computing device of claim 13, wherein the memory includes at least one of a volatile memory, a non-volatile memory and a cache memory.

15. The computing device of claim 13, wherein the scheme is utilized to detect an address range overlap associated with at least one of: a storage device of the computing device and an external device coupled to the computing device.

16. The computing device of claim 15, wherein the at least one of the storage device and the external device is coupled to the computing device through a network.

17. The computing device of claim 13, wherein the overlap between the first address range and the second address range corresponds to one of: two sets of instructions associated with a same device and two sets of instructions associated with different devices.

18. The computing device of claim 15, wherein the storage device is one of: a hard disk drive and a Redundant Array of Independent Disks (RAID)-based device.

19. The computing device of claim 13, wherein the scheme is implemented with:
- a first comparator to determine if the first starting address is one of greater than and equal to the second starting address;
- a second comparator to determine if the first starting address is one of less than and equal to the second ending address;
- a third comparator to determine if the second starting address is one of greater than and equal to the first starting address;
- a fourth comparator to determine if the second starting address is one of less than and equal to the first ending address;
- a first AND gate having an output of the first comparator and an output of the second comparator as inputs thereto;
- a second AND gate having an output of the third comparator and an output of the fourth comparator as inputs thereto; and
- an OR gate having an output of the first AND gate and an output of the second AND gate as inputs thereto.

20. The computing device of claim 13, wherein the scheme is utilized in a lookup table implemented with the memory.

* * * * *